US012689401B2

(12) United States Patent　　　　(10) Patent No.:　US 12,689,401 B2
Ivanov et al.　　　　　　　　　　　　(45) Date of Patent:　　　Jul. 21, 2026

(54) STRUCTURE OF SPATIALLY COUPLED MULTIPLE-INPUT MULTIPLE-OUTPUT COMMUNICATIONS

(71) Applicant: QUALCOMM Incorporated, San Diego, CA (US)

(72) Inventors: Kirill Ivanov, La Jolla, CA (US); Wei Yang, San Diego, CA (US); Jing Sun, San Diego, CA (US); Pinar Sen, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/783,170

(22) Filed: Jul. 24, 2024

(65) Prior Publication Data

US 2026/0031838 A1　　　Jan. 29, 2026

(51) Int. Cl.
H04B 7/0413　　　　(2017.01)
H04B 1/10　　　　　(2006.01)
(52) U.S. Cl.
CPC ............. H04B 1/10 (2013.01); H04B 7/0413 (2013.01)
(58) Field of Classification Search
CPC ................................. H04B 7/0413; H04B 7/10
See application file for complete search history.

(56) References Cited

U.S. PATENT DOCUMENTS

2008/0225965 A1*　9/2008　Pi ........................... H04B 7/068
　　　　　　　　　　　　　　　　　　　　　　　　714/800
2023/0139174 A1　　5/2023　Paz et al.
2024/0187152 A1　　6/2024　Jiang et al.

OTHER PUBLICATIONS

International Search Report and Written Opinion PCT/US2025/036077 ISA/EPO Oct. 15, 2025.

* cited by examiner

*Primary Examiner* — Rahel Guarino
(74) *Attorney, Agent, or Firm* — Patterson & Sheridan, L.L.P.

(57)　　　　　　ABSTRACT

Aspects of the present disclosure relate to wireless communications, and more particularly, to techniques for multiple-input multiple-output (MIMO) communications One aspect provides a method for wireless communication. The method includes receiving a signal using a multiple-input multiple-output (MIMO) receiver, wherein the signal includes at least a first code block (CB) including a first part received via a first layer of the MIMO receiver and a second part received via a second layer of the MIMO receiver, wherein the second part of the first CB is shifted within a spectrum by at least two resource positions with respect to the first part of the first CB; performing interference cancellation for the first CB; and decoding the first CB after performing the interference cancellation.

30 Claims, 16 Drawing Sheets

600

700

1100 —

|  | Resource 1 | Resource 2 | Resource 3 | Resource 4 | Resource 5 | Resource 6 | Resource 7 |
|---|---|---|---|---|---|---|---|
| Layer 1 | CB2 P2 | CB3 P2 | DMRS | Head CB P1 | Head CB P2 | CB0 P2 | CB1 P2 |
| Layer 0 | CB0 P1 | CB1 P1 | DMRS | CB2 P1 | CB3 P1 | Tail CB P1 | Tail CB P2 |

Spatial Domain

Time/Frequency

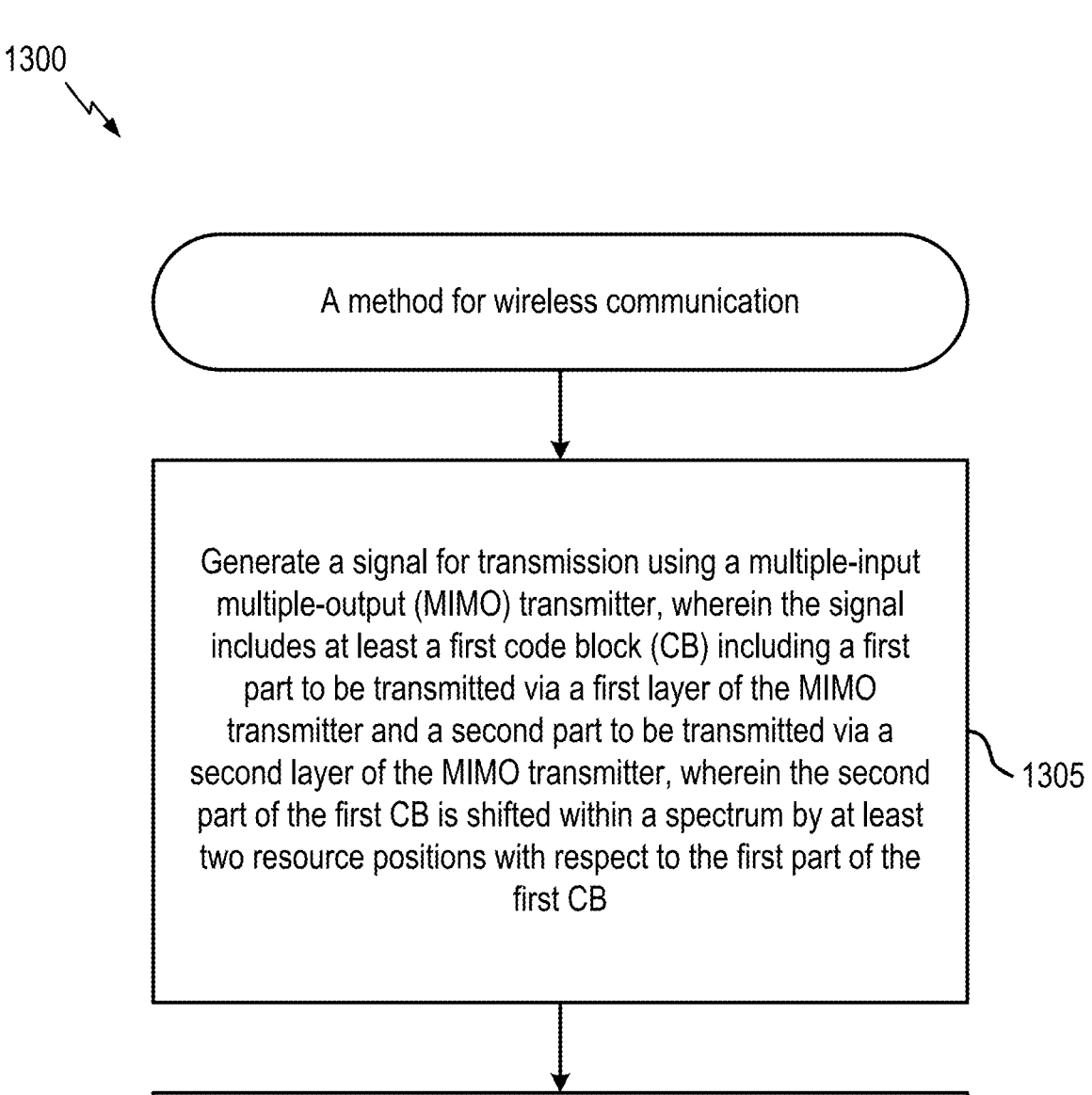

A method for wireless communication

Generate a signal for transmission using a multiple-input multiple-output (MIMO) transmitter, wherein the signal includes at least a first code block (CB) including a first part to be transmitted via a first layer of the MIMO transmitter and a second part to be transmitted via a second layer of the MIMO transmitter, wherein the second part of the first CB is shifted within a spectrum by at least two resource positions with respect to the first part of the first CB

1305

Transmit the signal via the MIMO transmitter

STRUCTURE OF SPATIALLY COUPLED MULTIPLE-INPUT MULTIPLE-OUTPUT COMMUNICATIONS

FIELD OF THE DISCLOSURE

Aspects of the present disclosure relate to wireless communications, and more particularly, to techniques for multiple-input multiple-output (MIMO) communications.

DESCRIPTION OF RELATED ART

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication. The method includes receiving a signal using a multiple-input multiple-output (MIMO) receiver, wherein the signal includes at least a first code block (CB) including a first part received via a first layer of the MIMO receiver and a second part received via a second layer of the MIMO receiver, wherein the second part of the first CB is shifted within a spectrum by at least two resource positions with respect to the first part of the first CB; performing interference cancellation for the first CB; and decoding the first CB after performing the interference cancellation.

Another aspect provides a method for wireless communication. The method includes generating a signal for transmission using a multiple-input multiple-output (MIMO) transmitter, wherein the signal includes at least a first code block (CB) including a first part to be transmitted via a first layer of the MIMO transmitter and a second part to be transmitted via a second layer of the MIMO transmitter, wherein the second part of the first CB is shifted within a spectrum by at least two resource positions with respect to the first part of the first CB; and transmitting the signal via the MIMO transmitter.

Other aspects provide: an apparatus operable, configured, or otherwise adapted to perform any one or more of the aforementioned methods and/or those described elsewhere herein; a non-transitory, computer-readable media comprising instructions that, when executed (e.g., directly, indirectly, after pre-processing, without pre-processing) by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 11 illustrates a design structure with a head CB placed adjacent to resources for a demodulation reference signal (DMRS), in accordance with certain aspects of the present disclosure.

FIG. 13 depicts a method for wireless communications.

DETAILED DESCRIPTION

Certain aspects of the present disclosure are directed toward a design structure of a spectrum for multiple-input multiple-output (MIMO) communications. For example, a signal for transmission may include a first code block (CB) that may include at least two parts, where one part of the first CB is cyclically shifted by at least two positions from another part of the CB. The parts of the first CB may be transmitted and received using different layers of a MIMO transmitter. The signal may also include a head CB to be transmitted on one or more of the layers of the MIMO transmitter. The design structure facilitates parallel decoding and/or successive interference cancellation (SIC) at a receiver. For example, a receiver may perform decoding of CBs at least partly in parallel in some aspects. In some aspects, decoding one CB may be performed in parallel with SIC for another CB, as described in more detail herein. Certain aspects increase hardware utilization, reducing latency associated with decoding signals received via a MIMO receiver. As used herein, interference cancellation generally refers to any process used to at least reduce interference with a CB before decoding.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
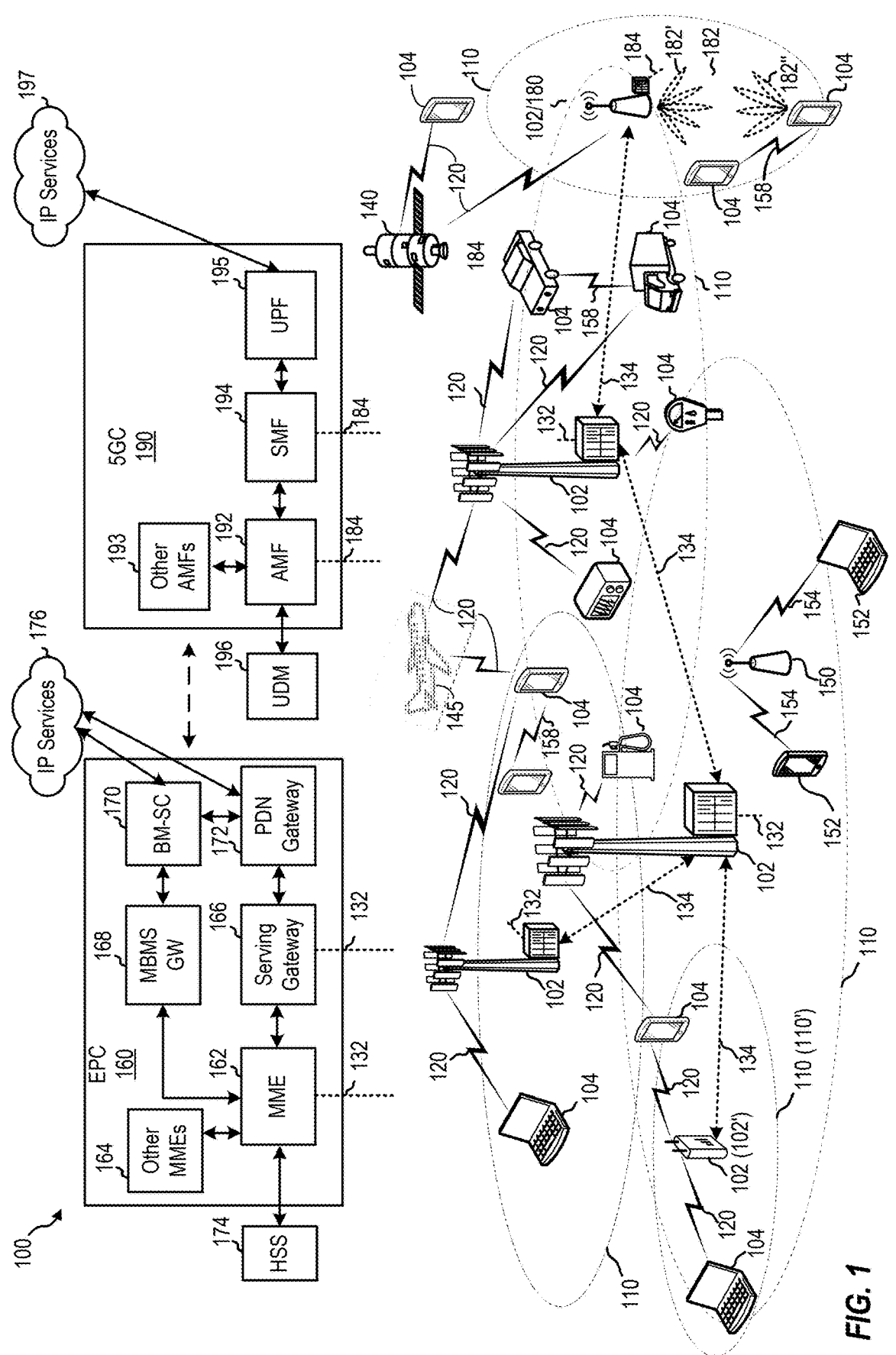
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
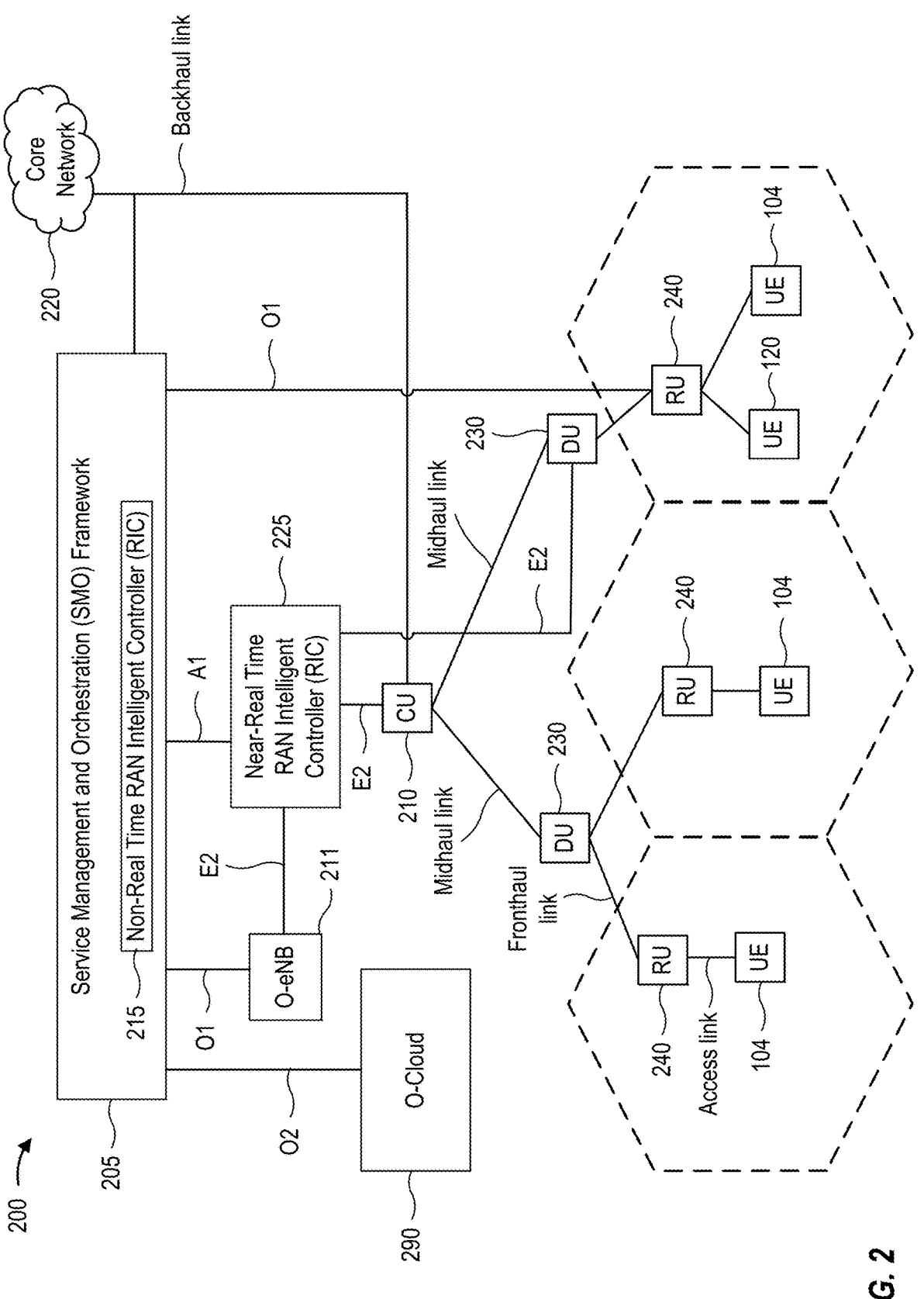
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHZ, which is sometimes referred to (interchangeably) as a "millimeter wave" ("mmW" or "mm Wave"). In some cases, FR2 may be further defined in terms of sub-ranges, such as a first sub-range FR2-1 including 24,250 MHz-52, 600 MHz and a second sub-range FR2-2 including 52,600 MHz-71,000 MHz. A base station configured to communicate using mm Wave/near mm Wave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
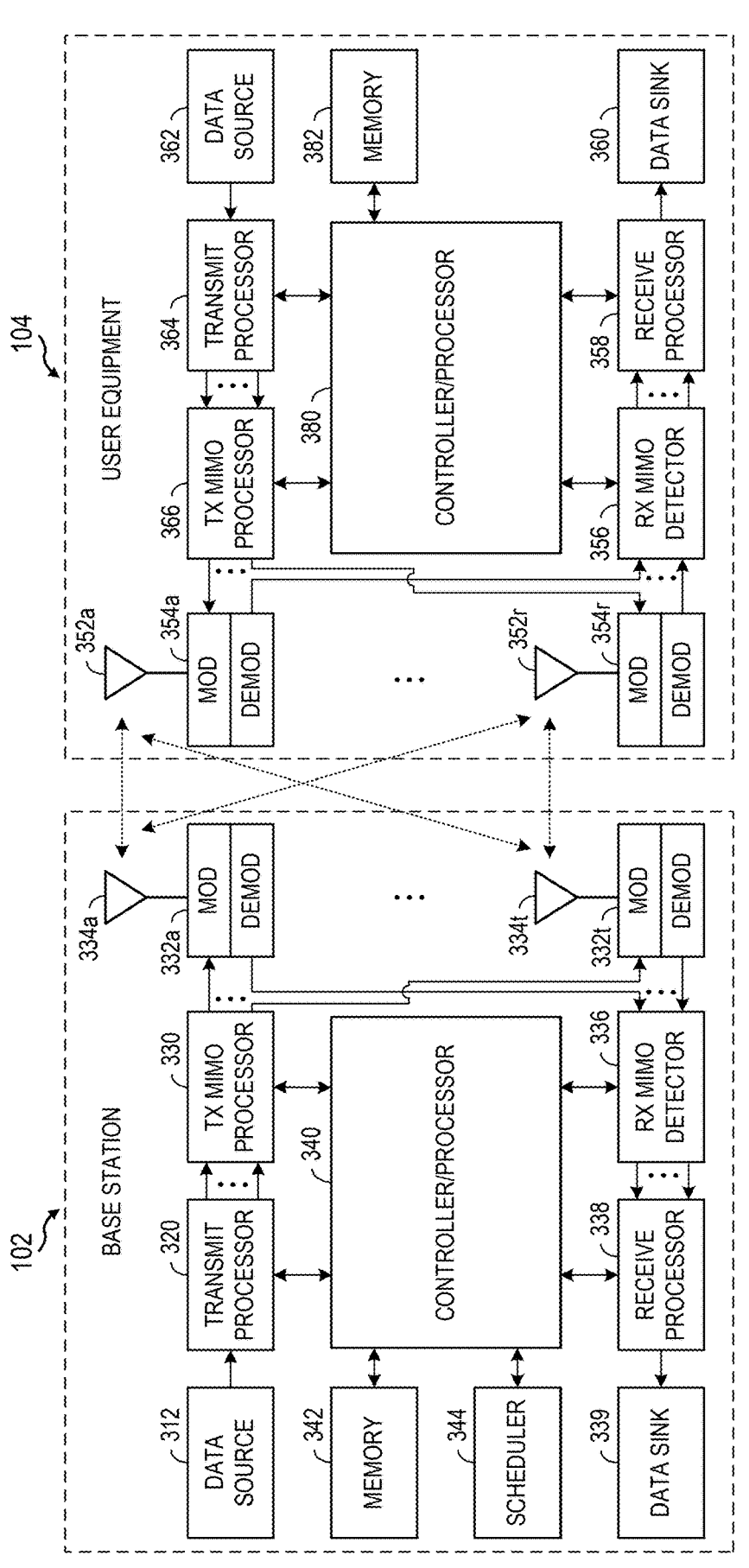
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/ processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a-332t*. Each modulator in transceivers 332*a-332t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a-332t* may be transmitted via the antennas 334*a-334t*, respectively.

In order to receive the downlink transmission, UE 104 includes antennas 352*a-352r* that may receive the downlink signals from the BS 102 and may provide received signals to the demodulators (DEMODs) in transceivers 354*a-354r*, respectively. Each demodulator in transceivers 354*a-354r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a-354r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a-354r* (e.g., for SC-FDM), and transmitted to BS 102.

At BS 102, the uplink signals from UE 104 may be received by antennas 334*a-t*, processed by the demodulators in transceivers 332*a-332t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, one or more processors may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
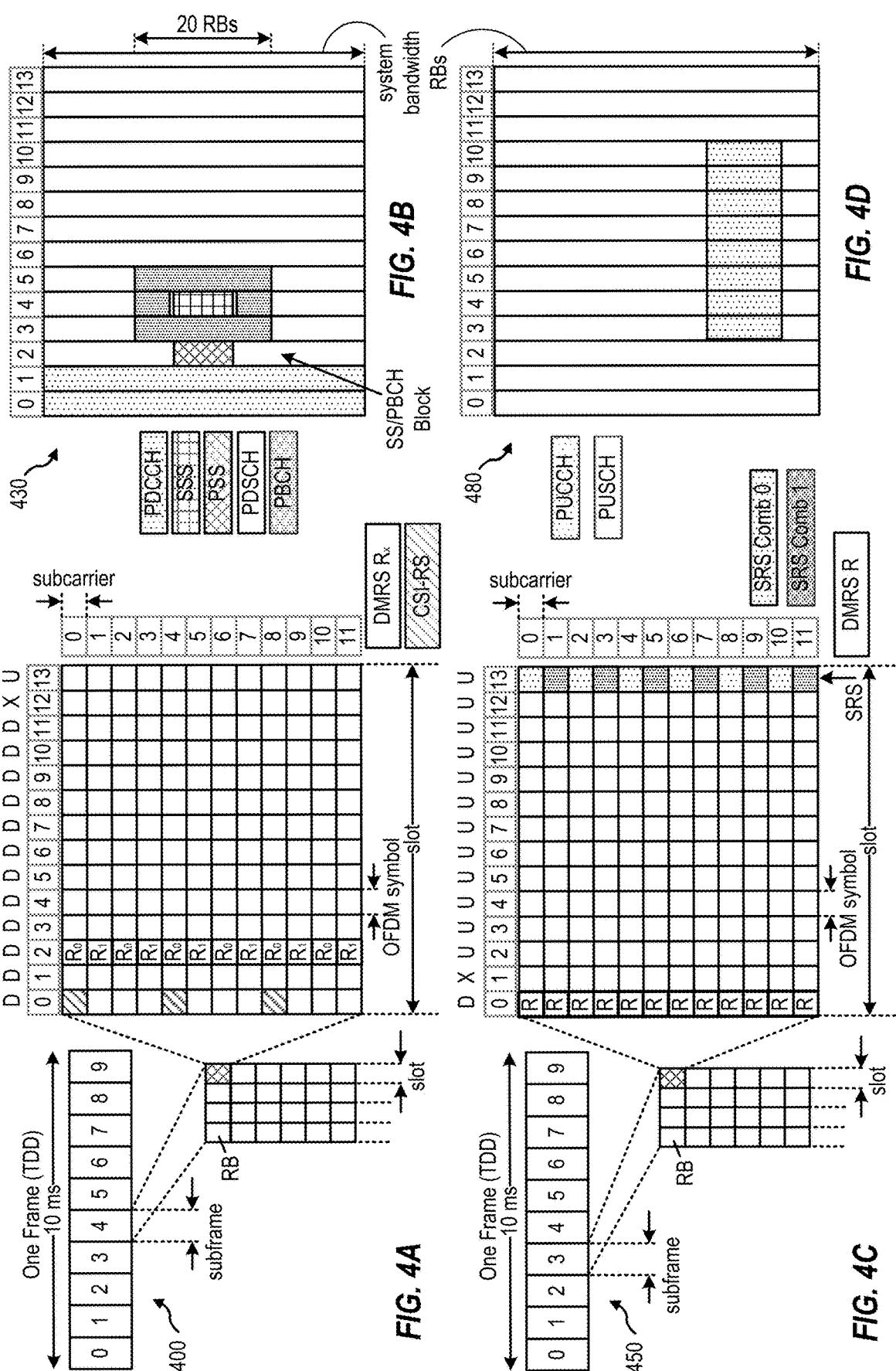
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where u is the numerology 0 to 6. As such, the numerology $\mu=0$ has a subcarrier spacing of 15 kHz and the numerology $\mu=6$ has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Spatially Coupled Multiple-Input Multiple-Output Communications Certain aspects of the present disclosure are directed towards a structure of a spectrum for spatially coupled multiple-input multiple-output (MIMO) communications. A MIMO transmitter or receiver may be implemented with multiple layers. A layer may refer to a data stream, and each data stream may be transmitted and received via one of multiple antennas used to implement a MIMO transmitter or receiver. For MIMO, at least two layers may be used and the number of layers may be less than or equal to the number of antennas. In some cases, MIMO may be implemented using a single-code word (CW) or a dual-CW implementation. For example, a code block (CB) may include a single CW or two CWs. A CW may refer to data before the data is formatted for transmission. One or two code words (e.g., CW0 and CW1) can be used, where the number of CWs may depend on the channel conditions.

Figures 5A, 5B:
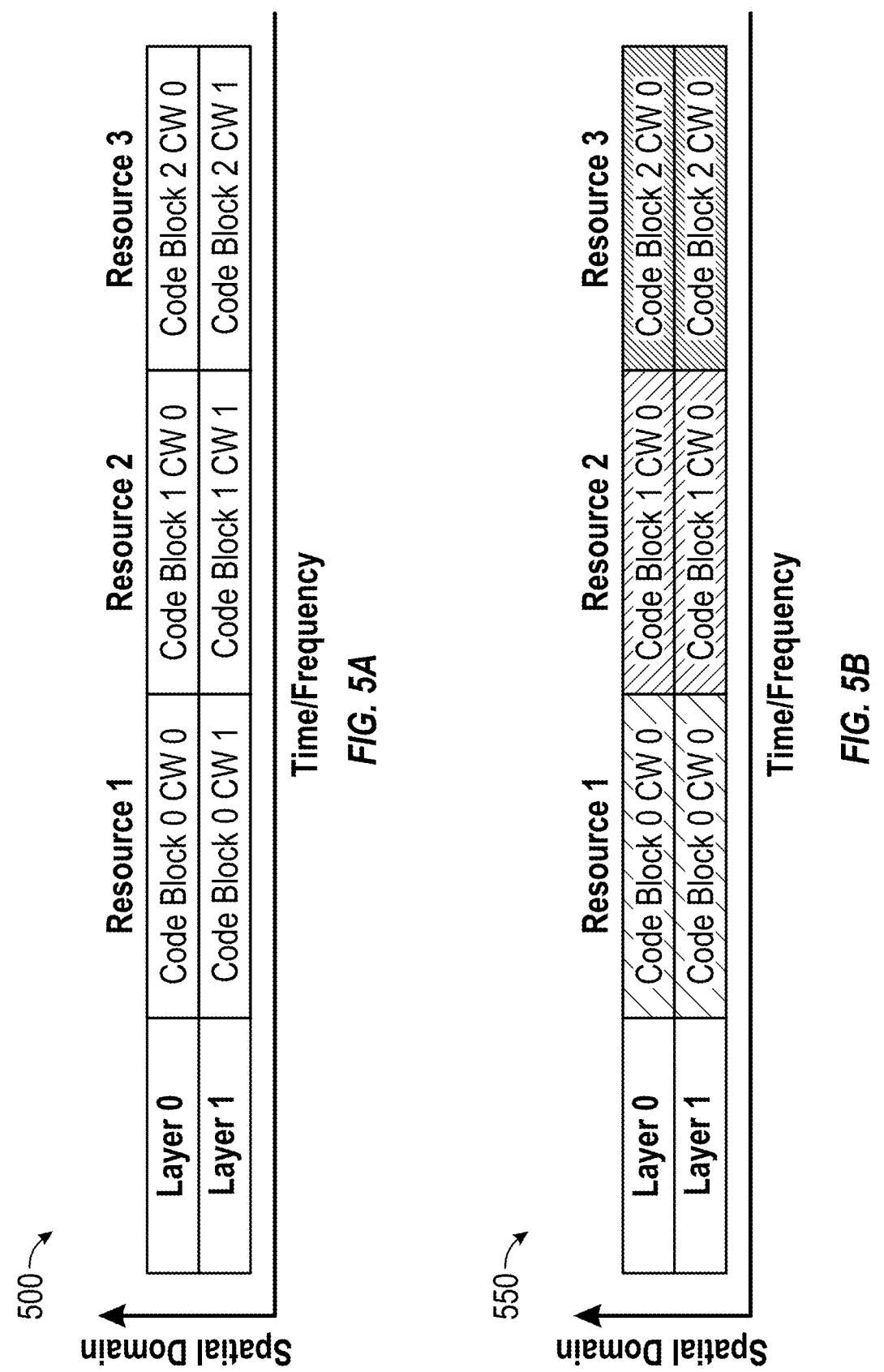
FIG. 5A illustrates a dual-code word (CW) multiple-input multiple-output (MIMO) design structure.
FIG. 5B illustrates a single-CW design structure.

FIG. 5A illustrates a dual CW MIMO design structure 500. As shown, CW0 and CW1 for CB0 may be transmitted via layer 0 and layer 1 using first time and/or frequency resource (e.g., referred to as "Resource 1"), respectively, followed by CW0 and CW1 for CB1 transmitted via layer 0 and layer 1 using second time and/or frequency resource (e.g., referred to as a "Resource 2") and so on. Each resource may represent any suitable time and frequency resource. For example, each resource may include less than or more than one OFDM symbol. The resources (e.g., Resource 1 and Resource 2) may represent the same number of resources. For example, each of the resources may be two OFDM symbols. CW0 and CW1 may be assigned different rates.

In some aspects, successive interference cancellation (SIC) may be applied to facilitate decoding of CBs. SIC is a technique that may be used by a receiver that allows the decoding of two or more CBs that have been received at least partly simultaneously. For example, a part of a first CB may interfere with a part of a second CB. Once the first CB is decoded, the first CB may be re-encoded and subtracted from a signal including the the second CB to reduce interference for decoding the second CB. For example, a stronger CB (e.g., a CB transmitted with improved channel conditions, which may be referred to as a "head CB") may be decoded first, re-encoded, and the re-encoded CB may be subtracted from the signal to reduce interference from the CB before decoding the other CB.

FIG. 5B illustrates a single CW design structure 550. In some cases, an irregular low-density parity check (LDPC) may be used. LDPC is a linear error correction code used to transmit a message over a noisy transmission channel. In some implementations, iterative demodulation and decoding across the two layers may be performed to increase decoding performance.

Figures 6, 7:
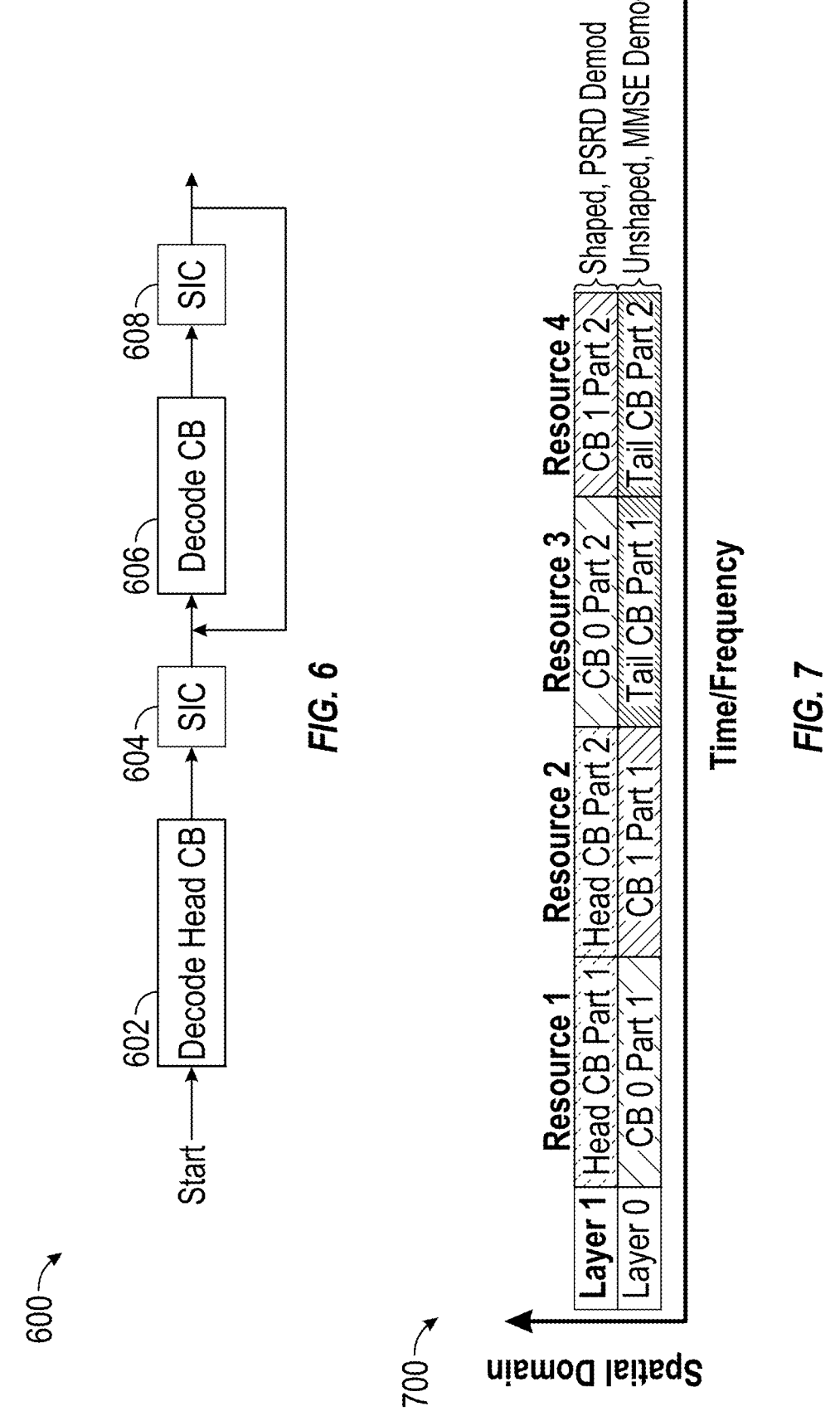
FIG. 6 is a flow diagram illustrating example operations for decoding using successive interference cancellation (SIC), in accordance with certain aspects of the present disclosure.
FIG. 7 illustrates an example design structure with a head code block (CB) on a first layer and a tail CB on a second layer, in accordance with certain aspects of the present disclosure.

FIG. 6 is a flow diagram illustrating example operations 600 for decoding using SIC, in accordance with certain aspects of the present disclosure. As shown, the operations 600 may include, at block 602, decoding a head CB, and at block 604, performing SIC based on the decoding of the head CB. For example, the decoded head CB may be re-encoded, and the re-encoded head CB may be subtracted from a signal, including a subsequent CB before decoding the subsequent CB. At block 606, after SIC is performed based on the re-encoded head CB, the subsequent CB may be decoded. At block 608, SIC may be performed based on the decoded subsequent CB to facilitate decoding of a subsequent CB. This process is repeated until all CBs are decoded.

Before decoding a subsequent CB, the decoding hardware may wait until the previous CB is re-encoded and SIC is completed, resulting in increased latency and decreased throughput due to the hardware being idle for a period of time. The hardware remaining idle until the SIC is performed causes decoding inefficiencies.

Certain aspects provide an improved CB mapping to a transmission (Tx) grid (e.g., spectrum) that increases hardware utilization, improving decode pipelining to reduce latency and increase throughput. For example, decoding two CBs may be performed in parallel or decoding one CB and SIC of another SIC may be performed in parallel, as described in more detail herein. A head CB may be decoded first, and a tail CB may be decoded at the end of the decoding process. Both the head and tail CBs may be mapped to respective layers or layer blocks (e.g., each layer block including multiple layers), as described in more detail herein. A head CB generally refers to any CB that is decoded first in time among the CBs, and in some cases, may be transmitted in a manner that provides improved channel conditions (e.g., transmitted with higher power and/or lower modulation and coding scheme (MCS)). A tail CB generally refers to any CB that is decoded last in time among the CBs. In some aspects, the position of the head CB within the time/frequency spectrum may be selected based on the channel conditions or where the expected channel estimation quality is best. For example, the head CB may be transmitted using resources next to DMRS to provide greater channel estimation quality.

FIG. 7 illustrates an example design structure 700 with a head CB on layer 1 of a MIMO transmitter or receiver and a tail CB on layer 2 of the MIMO transmitter or receiver, in accordance with certain aspects of the present disclosure. As shown, each CB may include two parts labeled as "Part 1" and "Part 2." The parts 1 and 2 of the head CB may be on layer 1 and parts 1 and 2 of the tail CB may be on layer 0. While the decoding techniques of the present disclosure are described with four CBs in FIG. 7 to facilitate understanding, certain aspects of the present disclosure may be applied to any suitable number of CBs.

As shown, different demodulation techniques may be applied for decoding CBs (or CB parts) received on layers 0 and layer 1. For example, a shaped per-stream recursive demapping (PSRD) technique may be performed for demodulating CB parts on layer 1 and an unshaped minimum mean square error (MMSE) demodulation technique may be performed for demodulating CB parts on layer 0. The shaped PSRD may provide greater decoding reliability, albeit with greater latency, as compared to the MMSE demodulation technique. Thus, since both parts of the head CB are on layer 1, the entire head CB may be shaped for PSRD demodulation, and since both parts of the tail CB are on layer 0, the entire tail CB may be unshaped for MMSE demodulation. Other CBs (e.g., such as CB0 and CB1 referred to herein as "regular CBs") may be partly shaped because one part of each regular CB is on layer 0 and another part of each regular CB is on layer 1. CB parts received on layer 1 may use PSRD as the CBs on layer 1 may be decoded without SIC, whereas the CBs on layer 2 may be decoded after SIC is applied, as described in more detail herein.

As shown, in addition to being on different layers, a second part of each regular CB may be cyclically shifted by two resource positions as compared to the first part of each regulator CB. That is, CB0 Part 1 may be on layer 0 and transmitted using resource 1 and CB0 Part 2 may be on layer 1 and transmitted using resource 3. Similarly, CB1 Part 1 may be on layer 0 and transmitted using resource 2 and CB1 Part 2 may be on layer 1 and transmitted using resource 4.

The MCS selection for the tail CB may take into account that the tail CB is unshaped and that the regular CBs are partly shaped. As described in more detail herein, the design structure 700 facilitates decoding two CBs in parallel or decoding one CB and performing SIC for another CB in parallel, decreasing decoding latency and increasing throughput.

While the design structure 700 is for two layers, certain aspects of the present disclosure may applied for any number of layers. For example, a design structure for a four-layer MIMO configuration is described with respect to FIG. 8.

Figure 8:
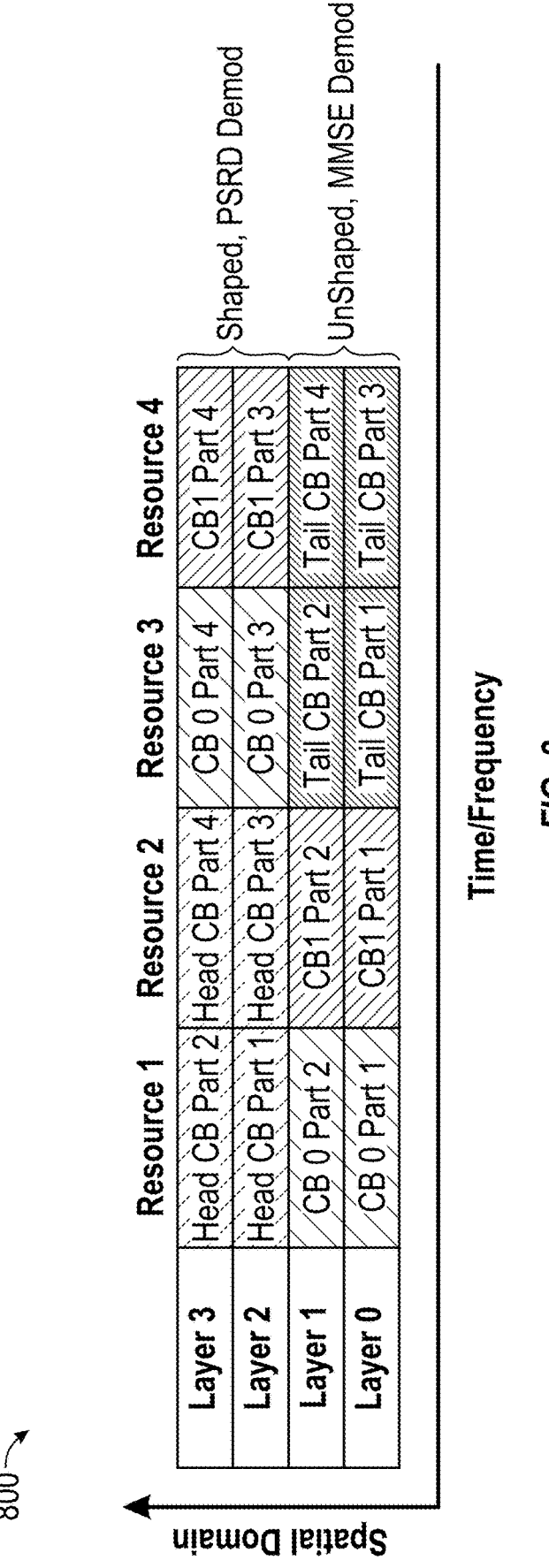
FIG. 8 illustrates an example design structure with a head CB on two layers and a tail CB on two layers, in accordance with certain aspects of the present disclosure.

FIG. 8 illustrates an example design structure 800 with a head CB on one layer block (e.g., layers 1 and 2) and a tail CB on another layer block (e.g., layers 0 and 1), in accordance with certain aspects of the present disclosure. For example, parts 1 and 2 of the head CB may be on respective layers 2 and 3 and transmitted via resource 1, and parts 3 and 4 of the head CB may be on respective layers 2 and 3 and transmitted via resource 2. Parts 1 and 2 of the tail CB may be on respective layers 0 and 1 and transmitted via resource 3, and parts 3 and 4 of the tail CB may be on respective layers 0 and 1 and transmitted via resource 4. Different parts of the regular CBs may be cyclically shifted as shown. For example, parts 1 and 2 of CB0 may be on respective layers 0 and 1 and transmitted via resource 1 and parts 3 and 4 of CB0 may be on respective layers 2 and 3 and transmitted via resource 3. As shown, CB parts on layers 0 and 1 may be decoded using unshaped MMSE demodulation and CB parts on layers 2 and 3 may be decoded using shaped PSRD demodulation.

Figures 9A, 9B:
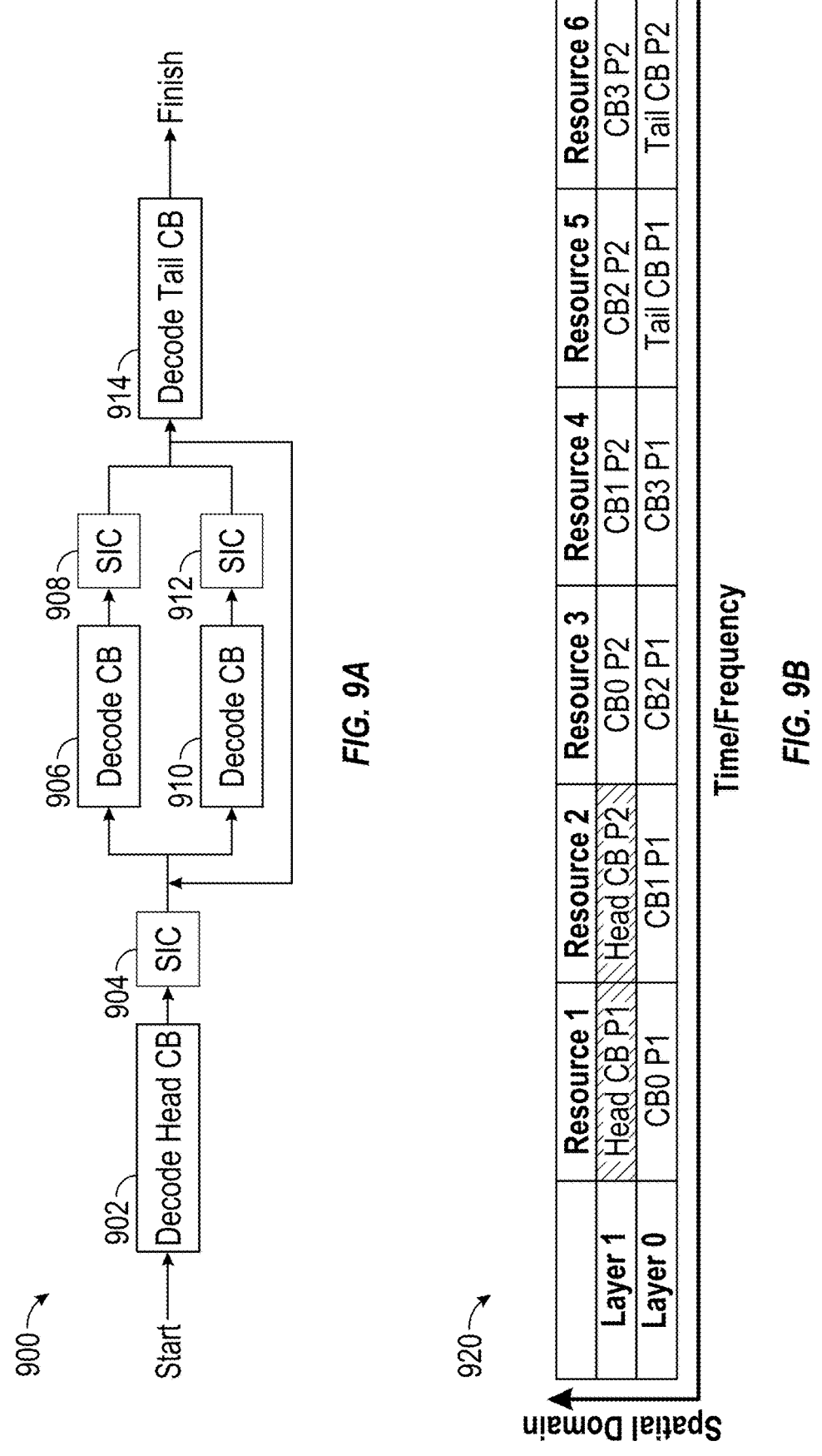
FIG. 9A is a flow diagram illustrating example operations for parallel decoding using SIC, in accordance with certain aspects of the present disclosure.
FIGS. 9B, 9C, 9D, and 9E illustrate spectrums at different decoding stages, in accordance with certain aspects of the present disclosure.
Figures 9C, 9D, 9E:
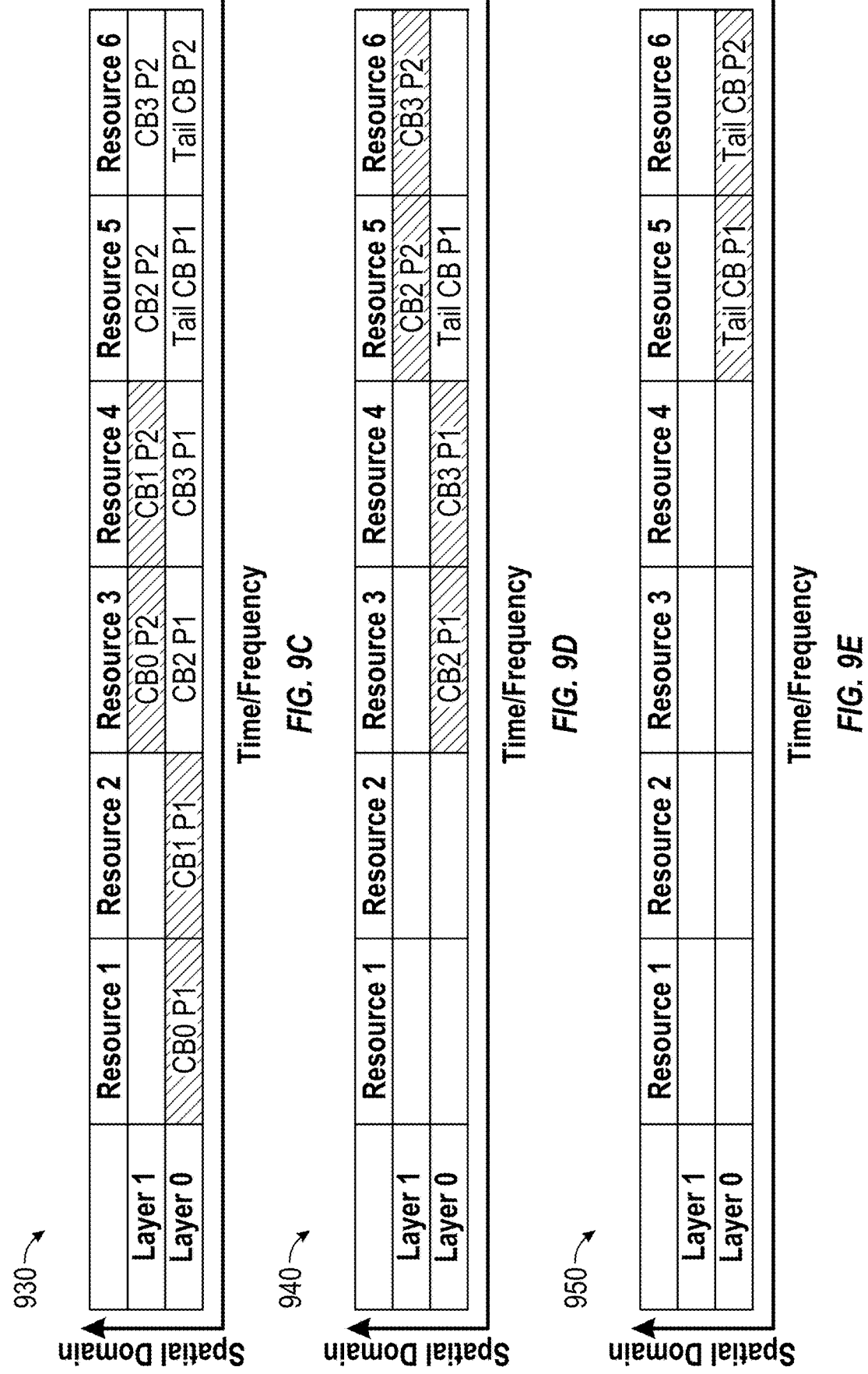

FIG. 9A is a flow diagram illustrating example operations 900 for parallel decoding using SIC, in accordance with certain aspects of the present disclosure. FIGS. 9B, 9C, 9D, and 9E illustrate spectrums at different decoding stages, in accordance with certain aspects of the present disclosure. In this case, after decoding the head CB and performing SIC, the receiver may decode two CBs in parallel, followed by performing SIC until the tail CB is decoded.

As shown, at block 902, parts 1 and 2 of the head CB (labeled "Head CB P1" and "Head CB P2") may be decoded as shown in the spectrum 920 of FIG. 9B. Once decoded, SCI for CB0 may be performed at block 904. For example, CB0 may be re-encoded and subtracted from the received signal to yield the spectrum 930 of FIG. 9C. At blocks 906, 910, subsequent CBs may be decoded at least partly simultaneously. For example, at block 906, parts 1 and 2 of CB0 (e.g., labeled "CB0 P1" and "CB0 P2") may be decoded, and simultaneously at block 910, parts 1 and 2 of CB1 (e.g., labeled "CB1 P1" and "CB1 P2") may be decoded. Once CB0 is decoded, the SIC for CB0 may be performed at block 910, and once CB1 is decoded, the SIC for CB1 may be performed at block 912, yielding the spectrum 940 of FIG. 9D. After the SIC is performed for CB0, the decoding for CB2 may be performed at block 906, and after the SIC is performed for CB1, the decoding for CB3 may be performed at block 910 (e.g., in parallel with the decoding for CB2). Once CB2 is decoded, SIC may be performed for CB2 at block 908, and once CB3 is decoded, SIC may be performed for CB3 at block 912, yielding spectrum 950 of FIG. 9E including the tail CB. At block 914, the tail CB may be decoded. By performing the decoding for two CBs in parallel, the decoding latency may be reduced and throughput may be increased.

Figures 10A, 10B:
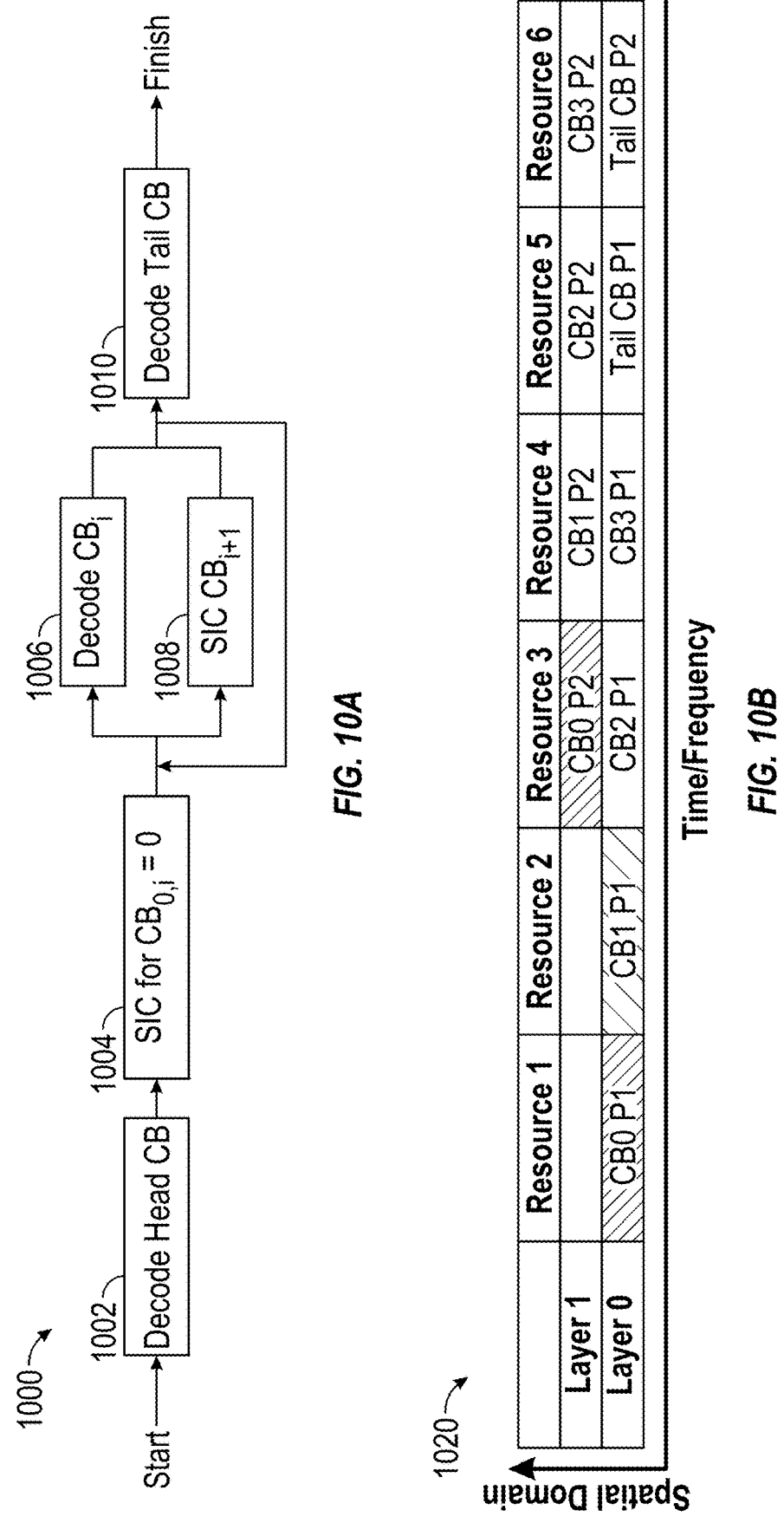
FIG. 10A is a flow diagram illustrating example operations for parallel decoding and SIC, in accordance with certain aspects of the present disclosure.
FIGS. 10B, 10C, and 10D illustrate spectrums at different decoding stages, in accordance with certain aspects of the present disclosure.
Figures 10C, 10D:
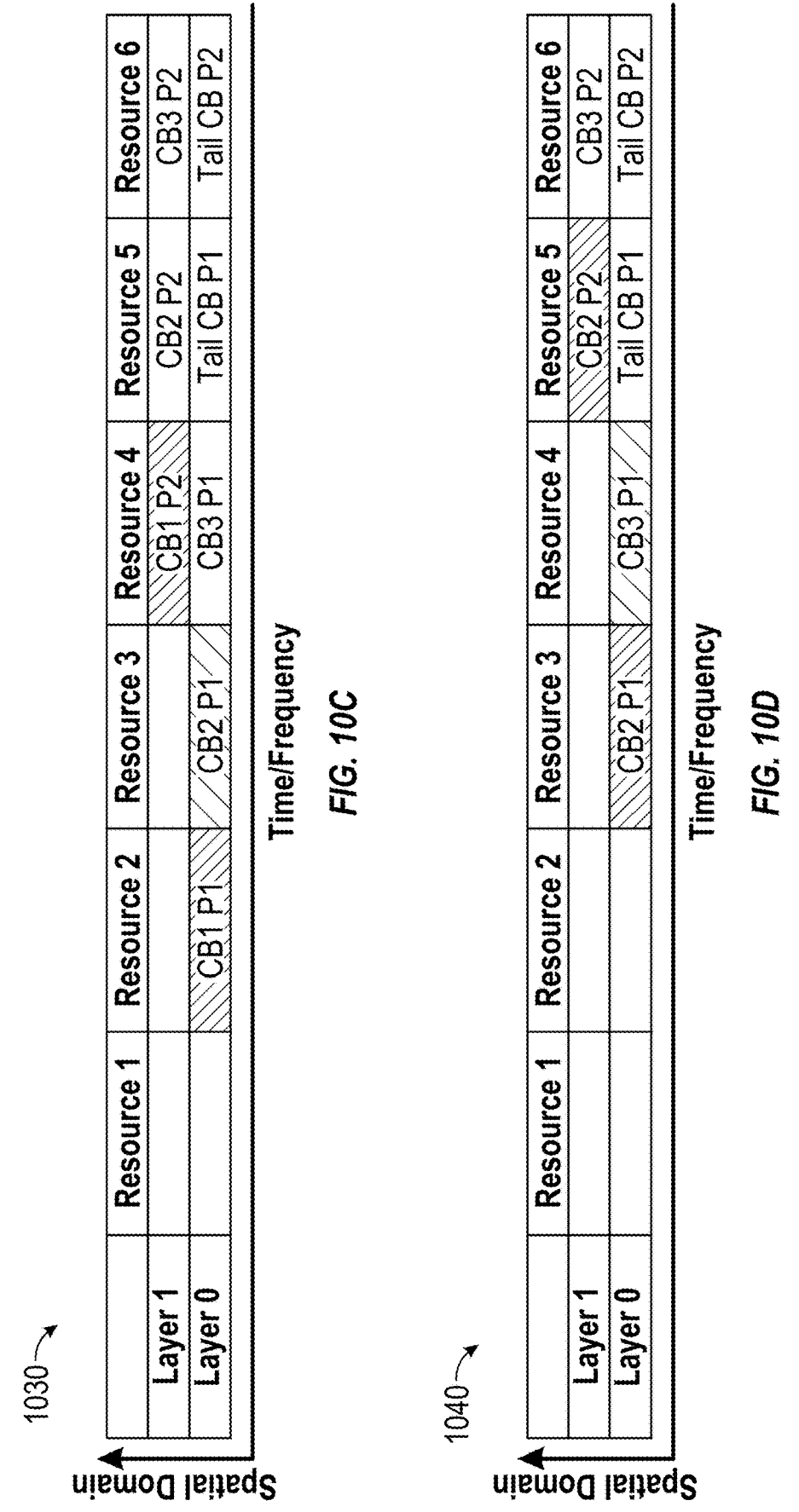

FIG. 10A is a flow diagram illustrating example operations 1000 for parallel decoding and SIC, in accordance with certain aspects of the present disclosure. FIGS. 10B, 10C, and 10D illustrate spectrums at different decoding stages, in accordance with certain aspects of the present disclosure. As shown, at block 1002, the head CB may be decoded and SIC may be performed for part 1 of CB0 at block 1004. For example, the re-encoded part 1 of the head CB may be subtracted from the received signal including part 1 of CB0.

Once the SIC for part 1 of CB0 (e.g., $CB_i$ where i is equal to 0) is completed, decoding may begin at block 1006 for part 1 of CB0 and part 2 of CB0. In parallel at block 1008, SIC may be performed for part 1 of $CB_{i+1}$ or CB1 (e.g., the re-encoded part 2 of the head CB may be subtracted from the received signal including part 1 of CB1), yielding the spectrum 1020 of FIG. 10B.

Once part 1 of CB0 is decoded and the SIC for part 1 of CB1 is compete, decoding may begin at block 1006 for part 1 of CB1 and part 2 of CB1 (e.g., parts 1 and 2 of $CB_i$ where i is incremented and is now equal to 1). In parallel at block 1008, SIC may be performed for part 1 of CB2 (e.g., the re-encoded part 2 of CB0 may be subtracted from the received signal including part 1 of CB2), yielding the spectrum 1030 of FIG. 10C.

Once part 1 of CB1 is decoded and the SIC for part 1 of CB2 is completed, decoding may begin at block 1006 for part 1 of CB2 and part 2 of CB2 (e.g., parts 1 and 2 of $CB_i$ where i is incremented and is now equal to 2). In parallel at block 1008, SIC may be performed for part 1 of CB3 (e.g., the re-encoded part 2 of CB1 may be subtracted from the received signal including part 1 of CB3), yielding the spectrum 1040 of FIG. 10D. This process may be continued until the tail CB is decoded at block 1010.

In this manner, the decoding and SIC may be performed in parallel and the decoding hardware may not remain idle waiting for the SIC to be performed. For example, as described, while decoding is being performed for part 1 of CB1, SIC is performed for part 2 of CB2 in parallel so that once the decoding for part 1 of CB1 is completed, the SIC for part 2 of CB2 is also completed, allowing the decoding hardware to move on to decoding CB2, increasing hardware utilization.

FIG. 11 illustrates a design structure 1100 with a head CB placed adjacent to resources for DMRS, in accordance with certain aspects of the present disclosure. It is important for the head CB to be decoded successfully to facilitate SIC for other CBs. By placing the head CB adjacent to the DMRS in the spectrum, channel estimation quality and/or channel conditions may be increased for the head CB. As shown, the CBs on one layer may be cyclically shifted by more than two resource positions with respect to the other layer depending on the DMRS location in the spectrum. Thus, parts 1 and 2 of the head CB may be on layer 1 and transmitted on resources 4 and 5, where DMRS is transmitted on resource 3. Thus, in this case, the CB parts on layer 1 may be cyclic shifted five times (e.g., instead of twice for the design structure 700 of FIG. 5) so that the head CB can be adjacent to the DMRS.

Example Operations

Figure 12:
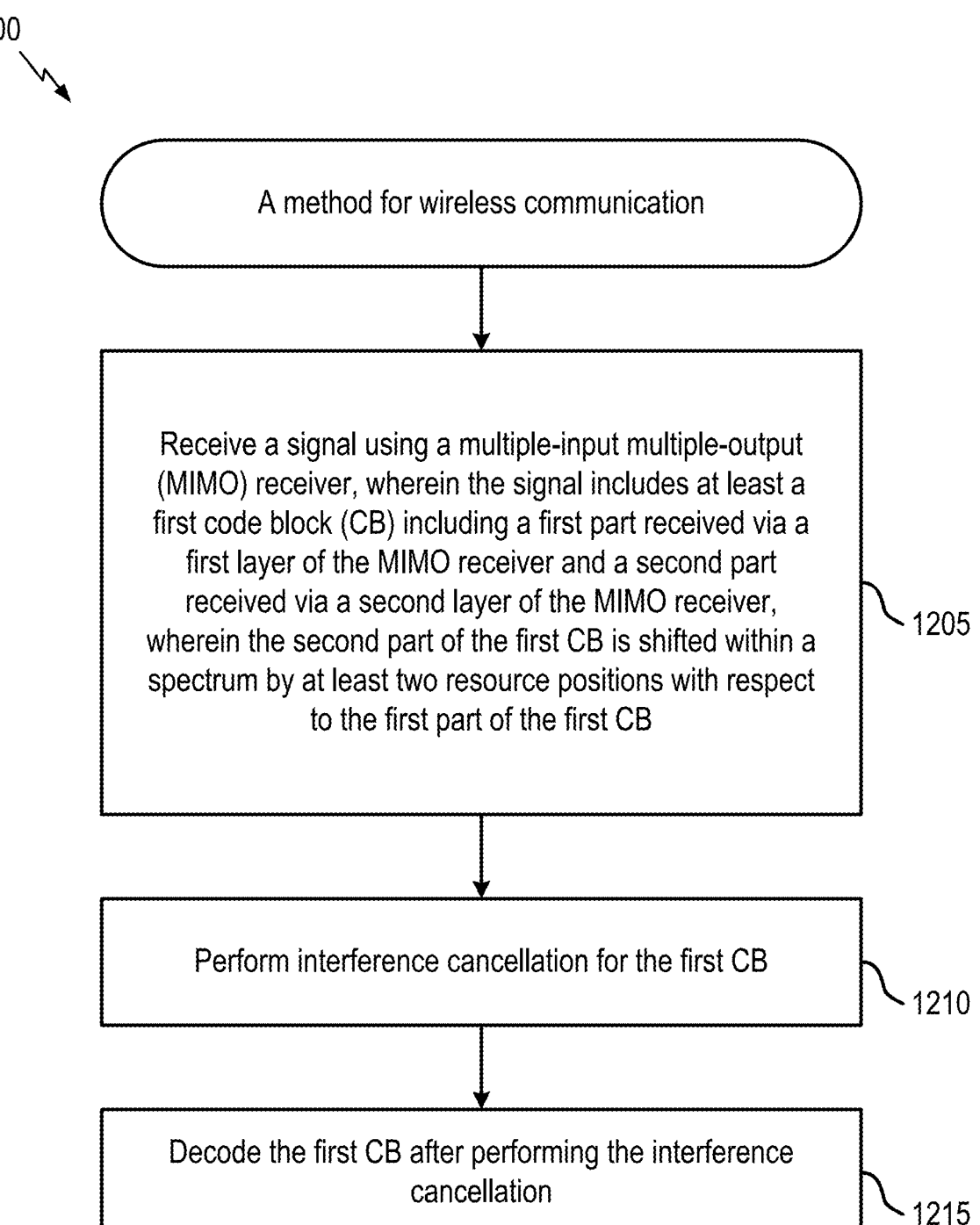
FIG. 12 depicts a method for wireless communications.

FIG. 12 shows an example of a method 1200 of wireless communication at a wireless node. In some examples, the wireless node is a user equipment, such as a UE 104 of FIGS. 1 and 3. In some examples, the wireless node is a network entity, such as a BS 102 of FIGS. 1 and 3, or a disaggregated base station as discussed with respect to FIG. 2.

Method 1200 begins at step 1205 with receiving a signal using a multiple-input multiple-output (MIMO) receiver, wherein the signal includes at least a first code block (CB) including a first part received via a first layer of the MIMO receiver and a second part received via a second layer of the MIMO receiver, wherein the second part of the first CB is shifted within a spectrum by at least two resource positions with respect to the first part of the first CB. In some cases, the operations of this step refer to, or may be performed by, circuitry for receiving and/or code for receiving as described with reference to FIG. 14.

Method 1200 then proceeds to step 1210 with performing interference cancellation for the first CB. In some cases, the operations of this step refer to, or may be performed by, circuitry for performing and/or code for performing as described with reference to FIG. 14.

Method 1200 then proceeds to step 1215 with decoding the first CB after performing the interference cancellation. In some cases, the operations of this step refer to, or may be performed by, circuitry for decoding and/or code for decoding as described with reference to FIG. 14.

In some aspects, the signal further comprises at least a head CB received via the second layer of the MIMO receiver; and the method further comprises decoding the head CB, the interference cancellation for the first CB being performed based on the decoding of the head CB.

In some aspects, at least a portion of the head CB is disposed on a resource of the spectrum that is adjacent to a resource including a demodulation reference signal (DMRS).

In some aspects, the signal further comprises at least a tail CB received via the first layer of the MIMO receiver.

In some aspects, the signal further comprises at least a second CB including a first part received via the first layer of the MIMO receiver and a second part received via the second layer of MIMO receiver; and the second part of the second CB is shifted within the spectrum by at least two resource positions with respect to the first part of the second CB.

In some aspects, the first part of the first CB is received via a first resource, wherein the first part of the second CB is received via a second resource, the first resource being adjacent to the second resource in the spectrum.

In some aspects, the second part of the second CB is shifted with respect to the first part of the second CB by the same amount of resource positions as the second part of the first CB is shifted with respect to the first part of the first CB.

In some aspects, the method 1200 further includes decoding the second CB, wherein at least part of the first CB is decoded simultaneously with the decoding of the second CB. In some cases, the operations of this step refer to, or may be performed by, circuitry for decoding and/or code for decoding as described with reference to FIG. 14.

In some aspects, the method 1200 further includes performing interference cancellation for the first part of the second CB based on the decoding of the second part of the first CB. In some cases, the operations of this step refer to, or may be performed by, circuitry for performing and/or code for performing as described with reference to FIG. 14.

In some aspects, the method 1200 further includes performing interference cancellation for a first part of a third CB based on the decoding of the second part of the second CB. In some cases, the operations of this step refer to, or may be performed by, circuitry for performing and/or code for performing as described with reference to FIG. 14.

In some aspects, the interference cancellation for the first part of the second CB is performed at least partly simultaneously with the interference cancellation for the first part of the third CB.

In some aspects, the method 1200 further includes performing interference cancellation for the first part of the second CB at least partly simultaneously with the decoding of the first CB. In some cases, the operations of this step refer to, or may be performed by, circuitry for performing and/or code for performing as described with reference to FIG. 14.

In some aspects, decoding the first CB comprises: demodulating the first part of the first CB received via the first layer using a first demodulation technique; and demodulating the second part of the first CB received via the second layer using a second demodulation technique different than the first demodulation technique.

In some aspects, the first demodulation technique comprises a minimum mean square error (MMSE) demodulation, and wherein the second demodulation technique comprises per-stream recursive demapping (PSRD) demodulation.

In some aspects, the first CB further includes a third part received via a third layer of the MIMO receiver and a fourth part received via a fourth layer of the MIMO receiver; the first part of the first CB and the third part of the first CB are received via a first resource; and the second part of the first CB and the fourth part of the first CB are received via a second resource different than the first resource.

Figure 14:
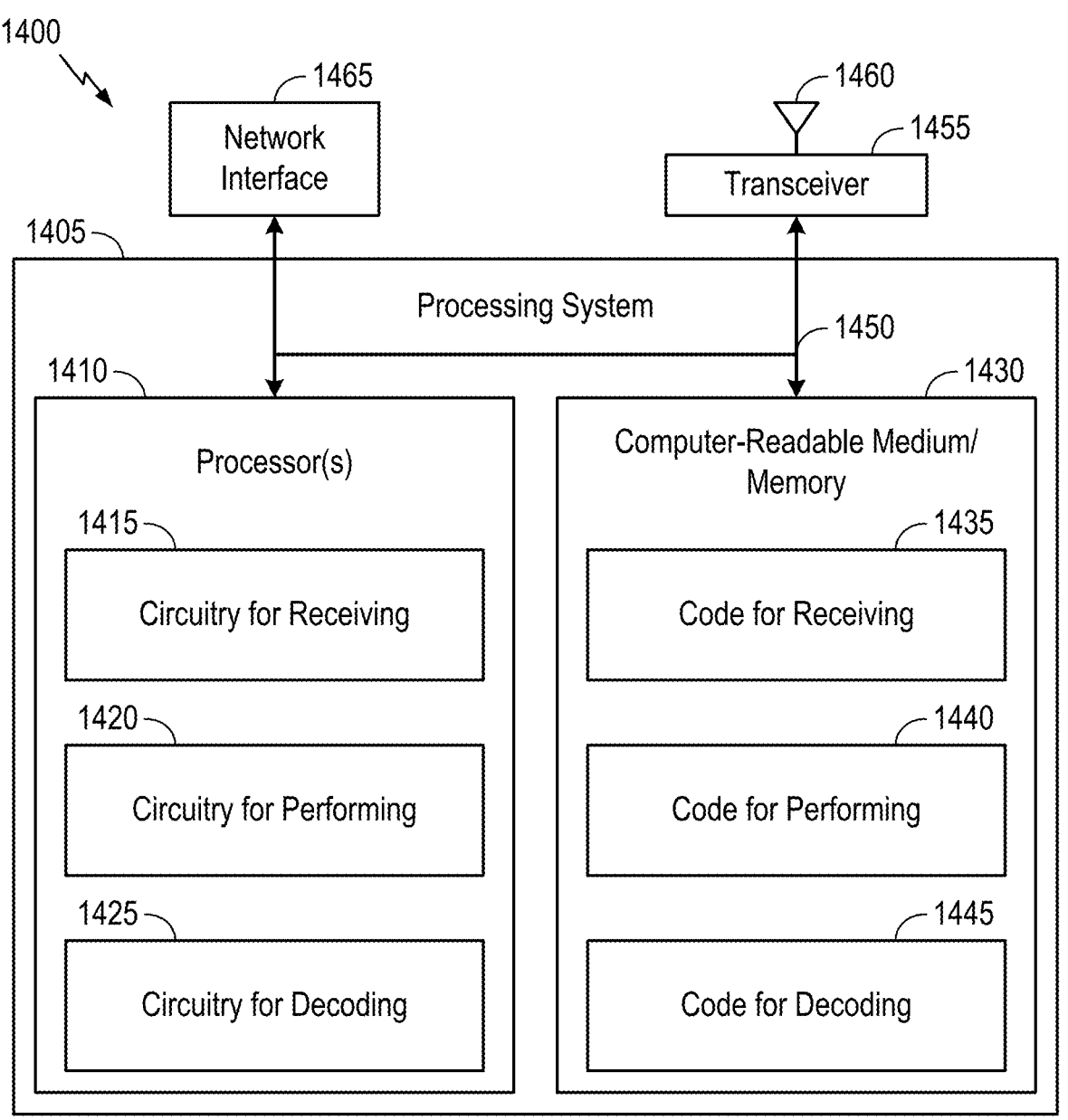
FIG. 14 depicts aspects of an example communications device.

In one aspect, method 1200, or any aspect related to it, may be performed by an apparatus, such as communications device 1400 of FIG. 14, which includes various components operable, configured, or adapted to perform the method 1200. Communications device 1400 is described below in further detail.

Note that FIG. 12 is just one example of a method, and other methods including fewer, additional, or alternative steps are possible consistent with this disclosure.

FIG. 13 shows an example of a method 1300 of wireless communication at a wireless node. In some examples, the wireless node is a user equipment, such as a UE 104 of FIGS. 1 and 3. In some examples, the wireless node is a network entity, such as a BS 102 of FIGS. 1 and 3, or a disaggregated base station as discussed with respect to FIG. 2.

Method 1300 begins at step 1305 with generating a signal for transmission using a multiple-input multiple-output (MIMO) transmitter, wherein the signal includes at least a first code block (CB) including a first part to be transmitted via a first layer of the MIMO transmitter and a second part to be transmitted via a second layer of the MIMO transmitter, wherein the second part of the first CB is shifted within a spectrum by at least two resource positions with respect to the first part of the first CB. In some cases, the operations of this step refer to, or may be performed by, circuitry for generating and/or code for generating as described with reference to FIG. 15.

Method 1300 then proceeds to step 1310 with transmitting the signal via the MIMO transmitter. In some cases, the operations of this step refer to, or may be performed by, circuitry for transmitting and/or code for transmitting as described with reference to FIG. 15.

In some aspects, the signal further comprises at least a head CB to be transmitted via the second layer of the MIMO transmitter.

In some aspects, at least a portion of the head CB is disposed on a resource of the spectrum that is adjacent to a resource including a demodulation reference signal (DMRS).

In some aspects, the signal further comprises at least a tail CB to be transmitted via the first layer of the MIMO transmitter.

In some aspects, the signal further comprises at least a second CB including a first part to be transmitted via the first layer of the MIMO transmitter and a second part to be transmitted via the second layer of MIMO transmitter; and the second part of the second CB is shifted within the spectrum by at least two resource positions with respect to the first part of the second CB.

In some aspects, the first part of the first CB is to be transmitted via a first resource, wherein the first part of the second CB is to be transmitted via a second resource, the first resource being adjacent to the second resource in the spectrum.

In some aspects, the second part of the second CB is shifted with respect to the first part of the second CB by the same amount of resources positions as the second part of the first CB is shifted with respect to the first part of the first CB.

In some aspects, the first CB further includes a third part to be transmitted via a third layer of the MIMO transmitter, and a fourth part to be transmitted via a fourth layer of the MIMO transmitter; the first part of the first CB and the third part of the first CB are to be transmitted via a first resource; and the second part of the first CB and the fourth part of the first CB are to be transmitted via a second resource different than the first resource.

Figure 15:
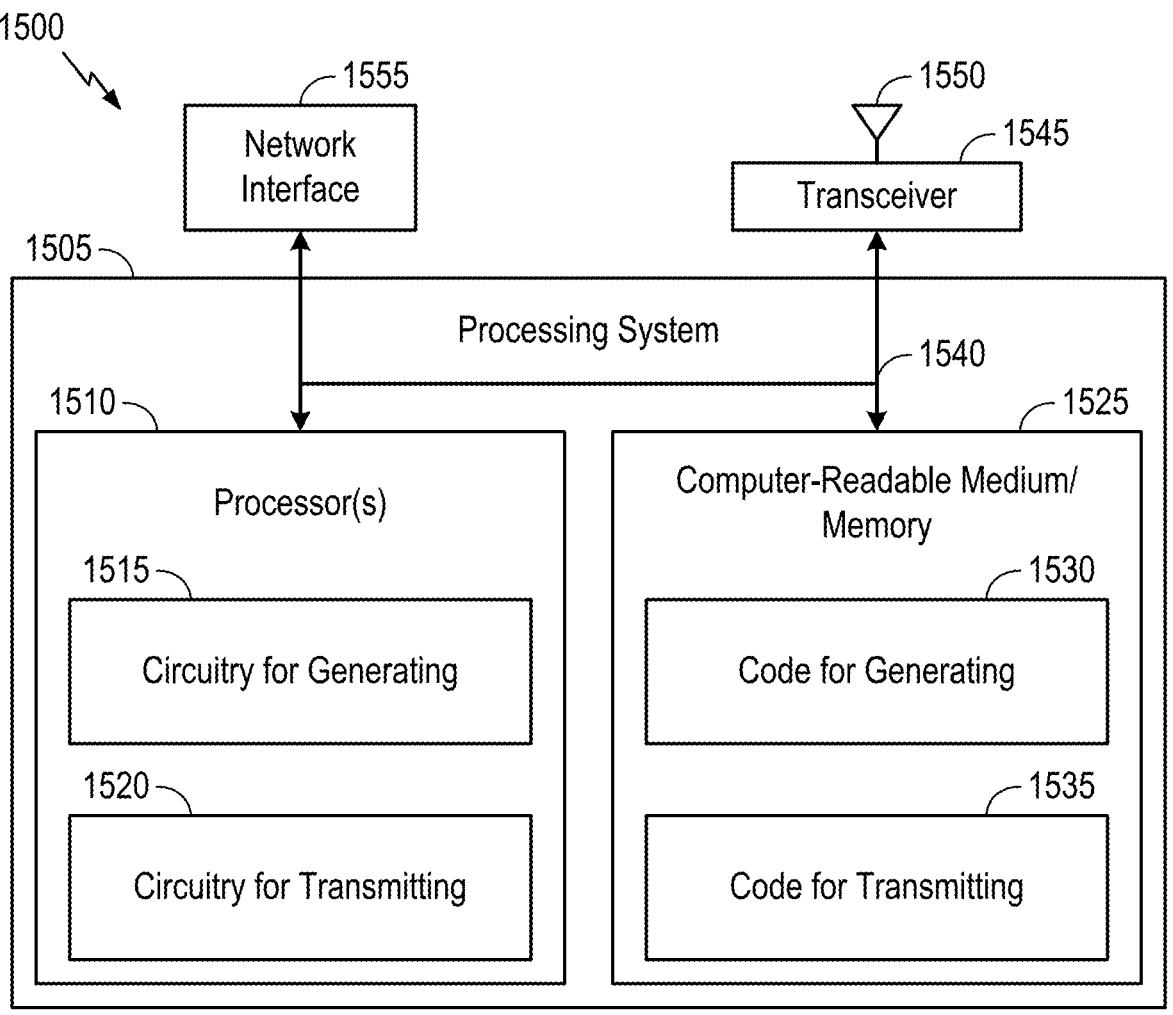
FIG. 15 depicts aspects of an example communications device.

In one aspect, method 1300, or any aspect related to it, may be performed by an apparatus, such as communications device 1500 of FIG. 15, which includes various components operable, configured, or adapted to perform the method 1300. Communications device 1500 is described below in further detail.

Note that FIG. 13 is just one example of a method, and other methods including fewer, additional, or alternative steps are possible consistent with this disclosure.

Example Communications Device(s)

FIG. 14 depicts aspects of an example communications device 1400. In some aspects, communications device 1400 is a user equipment, such as UE 104 described above with respect to FIGS. 1 and 3. In some aspects, communications device 1400 is a network entity, such as BS 102 of FIGS. 1 and 3, or a disaggregated base station as discussed with respect to FIG. 2.

The communications device 1400 includes a processing system 1405 coupled to the transceiver 1455 (e.g., a transmitter and/or a receiver). In some aspects (e.g., when communications device 1400 is a network entity), processing system 1405 may be coupled to a network interface 1465 that is configured to obtain and send signals for the communications device 1400 via communication link(s), such as a backhaul link, midhaul link, and/or fronthaul link as described herein, such as with respect to FIG. 2. The transceiver 1455 is configured to transmit and receive signals for the communications device 1400 via the antenna 1460, such as the various signals as described herein. The processing system 1405 may be configured to perform processing functions for the communications device 1400, including processing signals received and/or to be transmitted by the communications device 1400.

The processing system 1405 includes one or more processors 1410. In various aspects, the one or more processors 1410 may be representative of one or more of receive processor 358, transmit processor 364, TX MIMO processor 366, and/or controller/processor 380, as described with respect to FIG. 3. In various aspects, one or more processors 1410 may be representative of one or more of receive processor 338, transmit processor 320, TX MIMO processor 330, and/or controller/processor 340, as described with respect to FIG. 3. The one or more processors 1410 are coupled to a computer-readable medium/memory 1430 via a bus 1450. In certain aspects, the computer-readable medium/memory 1430 is configured to store instructions (e.g., computer-executable code) that when executed by the one or more processors 1410, cause the one or more processors 1410 to perform the method 1200 described with respect to FIG. 12, or any aspect related to it. Note that reference to a processor performing a function of communications device 1400 may include one or more processors 1410 performing that function of communications device 1400.

In the depicted example, computer-readable medium/memory 1430 stores code (e.g., executable instructions), such as code for receiving 1435, code for performing 1440, and code for decoding 1445. Processing of the code for receiving 1435, code for performing 1440, and code for decoding 1445 may cause the communications device 1400 to perform the method 1200 described with respect to FIG. 12, or any aspect related to it.

The one or more processors 1410 include circuitry configured to implement (e.g., execute) the code stored in the computer-readable medium/memory 1430, including circuitry for receiving 1415, circuitry for performing 1420, and circuitry for decoding 1425. Processing with circuitry for receiving 1415, circuitry for performing 1420, and circuitry for decoding 1425 may cause the communications device 1400 to perform the method 1200 described with respect to FIG. 12, or any aspect related to it.

Various components of the communications device 1400 may provide means for performing the method 1200 described with respect to FIG. 12, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1455 and the antenna 1460 of the communications device 1400 in FIG. 14. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1455 and the antenna 1460 of the communications device 1400 in FIG. 14.

FIG. 15 depicts aspects of an example communications device 1500. In some aspects, communications device 1500 is a user equipment, such as UE 104 described above with respect to FIGS. 1 and 3. In some aspects, communications device 1500 is a network entity, such as BS 102 of FIGS. 1 and 3, or a disaggregated base station as discussed with respect to FIG. 2.

The communications device 1500 includes a processing system 1505 coupled to the transceiver 1545 (e.g., a transmitter and/or a receiver). In some aspects (e.g., when communications device 1500 is a network entity), processing system 1505 may be coupled to a network interface 1555 that is configured to obtain and send signals for the communications device 1500 via communication link(s), such as a backhaul link, midhaul link, and/or fronthaul link as described herein, such as with respect to FIG. 2. The transceiver 1545 is configured to transmit and receive signals for the communications device 1500 via the antenna 1550, such as the various signals as described herein. The processing system 1505 may be configured to perform processing functions for the communications device 1500, including processing signals received and/or to be transmitted by the communications device 1500.

The processing system 1505 includes one or more processors 1510. In various aspects, the one or more processors 1510 may be representative of one or more of receive processor 358, transmit processor 364, TX MIMO processor 366, and/or controller/processor 380, as described with respect to FIG. 3. In various aspects, one or more processors 1510 may be representative of one or more of receive processor 338, transmit processor 320, TX MIMO processor 330, and/or controller/processor 340, as described with respect to FIG. 3. The one or more processors 1510 are coupled to a computer-readable medium/memory 1525 via a bus 1540. In certain aspects, the computer-readable medium/memory 1525 is configured to store instructions (e.g., computer-executable code) that when executed by the one or more processors 1510, cause the one or more processors 1510 to perform the method 1300 described with respect to FIG. 13, or any aspect related to it. Note that reference to a processor performing a function of communications device 1500 may include one or more processors 1510 performing that function of communications device 1500.

In the depicted example, computer-readable medium/memory 1525 stores code (e.g., executable instructions), such as code for generating 1530 and code for transmitting 1535. Processing of the code for generating 1530 and code for transmitting 1535 may cause the communications device 1500 to perform the method 1300 described with respect to FIG. 13, or any aspect related to it.

The one or more processors 1510 include circuitry configured to implement (e.g., execute) the code stored in the computer-readable medium/memory 1525, including circuitry for generating 1515 and circuitry for transmitting 1520. Processing with circuitry for generating 1515 and circuitry for transmitting 1520 may cause the communications device 1500 to perform the method 1300 described with respect to FIG. 13, or any aspect related to it.

Various components of the communications device 1500 may provide means for performing the method 1300 described with respect to FIG. 13, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1545 and the antenna 1550 of the communications device 1500 in FIG. 15. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1545 and the antenna 1550 of the communications device 1500 in FIG. 15.

Example Clauses

Implementation examples are described in the following numbered clauses:

Clause 1: A method for wireless communication, comprising: receiving a signal using a multiple-input multiple-output (MIMO) receiver, wherein the signal includes at least a first code block (CB) including a first part received via a first layer of the MIMO receiver and a second part received via a second layer of the MIMO receiver, wherein the second part of the first CB is shifted within a spectrum by at least two resource positions with respect to the first part of the first CB; performing interference cancellation for the first CB; and decoding the first CB after performing the interference cancellation.

Clause 2: The method of Clause 1, wherein: the signal further comprises at least a head CB received via the second layer of the MIMO receiver; and the method further comprises decoding the head CB, the interference cancellation for the first CB being performed based on the decoding of the head CB.

Clause 3: The method of Clause 2, wherein at least a portion of the head CB is disposed on a resource of the spectrum that is adjacent to a resource including a demodulation reference signal (DMRS).

Clause 4: The method of any one of Clauses 1-3, wherein the signal further comprises at least a tail CB received via the first layer of the MIMO receiver.

Clause 5: The method of any one of Clauses 1-4, wherein: the signal further comprises at least a second CB including a first part received via the first layer of the MIMO receiver and a second part received via the second layer of MIMO receiver; and the second part of the second CB is shifted within the spectrum by at least two resource positions with respect to the first part of the second CB.

Clause 6: The method of Clause 5, wherein the first part of the first CB is received via a first resource, wherein the first part of the second CB is received via a second resource, the first resource being adjacent to the second resource in the spectrum.

Clause 7: The method of Clause 5, wherein the second part of the second CB is shifted with respect to the first part of the second CB by the same amount of resource positions as the second part of the first CB is shifted with respect to the first part of the first CB.

Clause 8: The method of Clause 5, further comprising decoding the second CB, wherein at least part of the first CB is decoded simultaneously with the decoding of the second CB.

Clause 9: The method of Clause 5, further comprising: performing interference cancellation for the first part of the second CB based on the decoding of the second part of the first CB; and performing interference cancellation for a first part of a third CB based on the decoding of the second part of the second CB.

Clause 10: The method of Clause 9, wherein the interference cancellation for the first part of the second CB is performed at least partly simultaneously with the interference cancellation for the first part of the third CB.

Clause 11: The method of Clause 5, further comprising performing interference cancellation for the first part of the second CB at least partly simultaneously with the decoding of the first CB.

Clause 12: The method of any one of Clauses 1-11, wherein decoding the first CB comprises: demodulating first part of the first CB received via the first layer using a first demodulation technique; and demodulating the second part of the first CB received via the second layer using a second demodulation technique different than the first demodulation technique.

Clause 13: The method of Clause 12, wherein the first demodulation technique comprises a minimum mean square error (MMSE) demodulation, and wherein the second demodulation technique comprises per-stream recursive demapping (PSRD) demodulation.

Clause 14: The method of any one of Clauses 1-13, wherein: the first CB further includes a third part received via a third layer of the MIMO receiver and a fourth part received via a fourth layer of the MIMO receiver; the first part of the first CB and the third part of the first CB are received via a first resource; and the second part of the first CB and the fourth part of the first CB are received via a second resource different than the first resource.

Clause 15: A method for wireless communication, comprising: generating a signal for transmission using a multiple-input multiple-output (MIMO) transmitter, wherein the signal includes at least a first code block (CB) including a first part to be transmitted via a first layer of the MIMO transmitter and a second part to be transmitted via a second layer of the MIMO transmitter, wherein the second part of the first CB is shifted within a spectrum by at least two resource positions with respect to the first part of the first CB; and transmitting the signal via the MIMO transmitter.

Clause 16: The method of Clause 15, wherein the signal further comprises at least a head CB to be transmitted via the second layer of the MIMO transmitter.

Clause 17: The method of Clause 16, wherein at least a portion of the head CB is disposed on a resource of the spectrum that is adjacent to a resource including a demodulation reference signal (DMRS).

Clause 18: The method of any one of Clauses 15-17, wherein the signal further comprises at least a tail CB to be transmitted via the first layer of the MIMO transmitter.

Clause 19: The method of any one of Clauses 15-18, wherein: the signal further comprises at least a second CB including a first part to be transmitted via the first layer of the MIMO transmitter and a second part to be transmitted via the second layer of MIMO transmitter; and the second part of the second CB is shifted within the spectrum by at least two resource positions with respect to the first part of the second CB.

Clause 20: The method of Clause 19, wherein the first part of the first CB is to be transmitted via a first resource, wherein the first part of the second CB is to be transmitted via a second resource, the first resource being adjacent to the second resource in the spectrum.

Clause 21: The method of Clause 19, wherein the second part of the second CB is shifted with respect to the first part of the second CB by the same amount of resources positions as the second part of the first CB is shifted with respect to the first part of the first CB.

Clause 22: The method of any one of Clauses 15-21, wherein: the first CB further includes a third part to be transmitted via a third layer of the MIMO transmitter, and a fourth part to be transmitted via a fourth layer of the MIMO transmitter; the first part of the first CB and the third part of the first CB are to be transmitted via a first resource; and the second part of the first CB and the fourth part of the first CB are to be transmitted via a second resource different than the first resource.

Clause 23: An apparatus, comprising: at least one memory comprising executable instructions; and at least one processor configured to execute the executable instructions and cause the apparatus to perform a method in accordance with any combination of Clauses 1-22.

Clause 24: An apparatus, comprising means for performing a method in accordance with any combination of Clauses 1-22.

Clause 25: A non-transitory computer-readable medium comprising executable instructions that, when executed by at least one processor of an apparatus, cause the apparatus to perform a method in accordance with any combination of Clauses 1-22.

Clause 26: A computer program product embodied on a computer-readable storage medium comprising code for performing a method in accordance with any combination of Clauses 1-22.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a graphics processing unit (GPU), a neural processing unit (NPU), a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

Means for generating, means for transmitting, means for receiving, means for decoding, and means for determining may comprise one or more processors, such as one or more of the processors described above with reference to FIG. 14, and FIG. 15.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication, comprising:
receiving a signal using a multiple-input multiple-output (MIMO) receiver, wherein the signal includes at least a first code block (CB) including a first part received via a first layer of the MIMO receiver and a second part received via a second layer of the MIMO receiver, wherein the second part of the first CB is shifted within a spectrum by at least two resource positions with respect to the first part of the first CB;
performing interference cancellation for the first CB; and
decoding the first CB after performing the interference cancellation.

2. The method of claim 1, wherein:
the signal further comprises at least a head CB received via the second layer of the MIMO receiver; and
the method further comprises decoding the head CB, the interference cancellation for the first CB being performed based on the decoding of the head CB.

3. The method of claim 2, wherein at least a portion of the head CB is disposed on a resource of the spectrum that is adjacent to a resource including a demodulation reference signal (DMRS).

4. The method of claim 1, wherein the signal further comprises at least a tail CB received via the first layer of the MIMO receiver.

5. The method of claim 1, wherein:
the signal further comprises at least a second CB including a first part received via the first layer of the MIMO receiver and a second part received via the second layer of MIMO receiver; and
the second part of the second CB is shifted within the spectrum by at least two resource positions with respect to the first part of the second CB.

6. The method of claim 5, wherein the first part of the first CB is received via a first resource, wherein the first part of the second CB is received via a second resource, the first resource being adjacent to the second resource in the spectrum.

7. The method of claim 5, wherein the second part of the second CB is shifted with respect to the first part of the second CB by the same amount of resource positions as the second part of the first CB is shifted with respect to the first part of the first CB.

8. The method of claim 5, further comprising decoding the second CB, wherein at least part of the first CB is decoded simultaneously with the decoding of the second CB.

9. The method of claim 5, further comprising:
performing interference cancellation for the first part of the second CB based on decoding of the second part of the first CB; and
performing interference cancellation for a first part of a third CB based on decoding of the second part of the second CB.

10. The method of claim 9, wherein the interference cancellation for the first part of the second CB is performed at least partly simultaneously with the interference cancellation for the first part of the third CB.

11. The method of claim 5, further comprising performing interference cancellation for the first part of the second CB at least partly simultaneously with the decoding of the first CB.

12. The method of claim 1, wherein decoding the first CB comprises:
demodulating the first part of the first CB received via the first layer using a first demodulation technique; and
demodulating the second part of the first CB received via the second layer using a second demodulation technique different than the first demodulation technique.

13. The method of claim 12, wherein the first demodulation technique comprises a minimum mean square error (MMSE) demodulation, and wherein the second demodulation technique comprises per-stream recursive demapping (PSRD) demodulation.

14. The method of claim 1, wherein:
the first CB further includes a third part received via a third layer of the MIMO receiver and a fourth part received via a fourth layer of the MIMO receiver;
the first part of the first CB and the third part of the first CB are received via a first resource; and
the second part of the first CB and the fourth part of the first CB are received via a second resource different than the first resource.

15. A method for wireless communication, comprising:
generating a signal for transmission using a multiple-input multiple-output (MIMO) transmitter, wherein the signal includes at least a first code block (CB) including a first part to be transmitted via a first layer of the MIMO transmitter and a second part to be transmitted via a second layer of the MIMO transmitter, wherein the second part of the first CB is shifted within a spectrum by at least two resource positions with respect to the first part of the first CB; and
transmitting the signal via the MIMO transmitter.

16. The method of claim 15, wherein the signal further comprises at least a head CB to be transmitted via the second layer of the MIMO transmitter.

17. The method of claim 16, wherein at least a portion of the head CB is disposed on a resource of the spectrum that is adjacent to a resource including a demodulation reference signal (DMRS).

18. The method of claim 15, wherein the signal further comprises at least a tail CB to be transmitted via the first layer of the MIMO transmitter.

19. The method of claim 15, wherein:
the signal further comprises at least a second CB including a first part to be transmitted via the first layer of the MIMO transmitter and a second part to be transmitted via the second layer of MIMO transmitter; and the second part of the second CB is shifted within the spectrum by at least two resource positions with respect to the first part of the second CB.

20. The method of claim 19, wherein the first part of the first CB is to be transmitted via a first resource, wherein the first part of the second CB is to be transmitted via a second resource, the first resource being adjacent to the second resource in the spectrum.

21. The method of claim 19, wherein the second part of the second CB is shifted with respect to the first part of the second CB by the same amount of resources positions as the second part of the first CB is shifted with respect to the first part of the first CB.

22. The method of claim 15, wherein:

the first CB further includes a third part to be transmitted via a third layer of the MIMO transmitter, and a fourth part to be transmitted via a fourth layer of the MIMO transmitter;

the first part of the first CB and the third part of the first CB are to be transmitted via a first resource; and the second part of the first CB and the fourth part of the first CB are to be transmitted via a second resource different than the first resource.

23. An apparatus for wireless communication, comprising:

at least one memory; and one or more processors coupled to the at least one memory, the one or more processors being configured to:

receive a signal using a multiple-input multiple-output (MIMO) receiver, wherein the signal includes at least a first code block (CB) including a first part received via a first layer of the MIMO receiver and a second part received via a second layer of the MIMO receiver, wherein the second part of the first CB is shifted within a spectrum by at least two resource positions with respect to the first part of the first CB; and perform interference cancellation for the first CB; and decode the first CB after performing the interference cancellation.

24. The apparatus of claim 23, wherein:

the signal further comprises at least a head CB received via the second layer of the MIMO receiver; and the one or more processors are further configured to decode the head CB, the interference cancellation for the first CB being performed based on the decoding of the head CB.

25. The apparatus of claim 24, wherein at least a portion of the head CB is disposed on a resource of the spectrum that is adjacent to a resource including a demodulation reference signal (DMRS).

26. The apparatus of claim 23, wherein the signal further comprises at least a tail CB received via the first layer of the MIMO receiver.

27. The apparatus of claim 23, wherein:

the signal further comprises at least a second CB including a first part received via the first layer of the MIMO receiver and a second part received via the second layer of MIMO receiver; and the second part of the second CB is shifted within the spectrum by at least two resource positions with respect to the first part of the second CB.

28. The apparatus of claim 27, wherein the first part of the first CB is received via a first resource, wherein the first part of the second CB is received via a second resource, the first resource being adjacent to the second resource in the spectrum.

29. The apparatus of claim 27, wherein the second part of the second CB is shifted with respect to the first part of the second CB by the same amount of resource positions as the second part of the first CB is shifted with respect to the first part of the first CB.

30. An apparatus for wireless communication, comprising:

at least one memory; and one or more processors coupled to the at least one memory, the one or more processors being configured to:

generate a signal for transmission using a multiple-input multiple-output (MIMO) transmitter, wherein the signal includes at least a first code block (CB) including a first part to be transmitted via a first layer of the MIMO transmitter and a second part to be transmitted via a second layer of the MIMO transmitter, wherein the second part of the first CB is shifted within a spectrum by at least two resource positions with respect to the first part of the first CB; and transmit the signal via the MIMO transmitter.

\* \* \* \* \*